S. BINGHAM.
Horse Rake.
No. 51,287.
Patented Dec. 5, 1865.
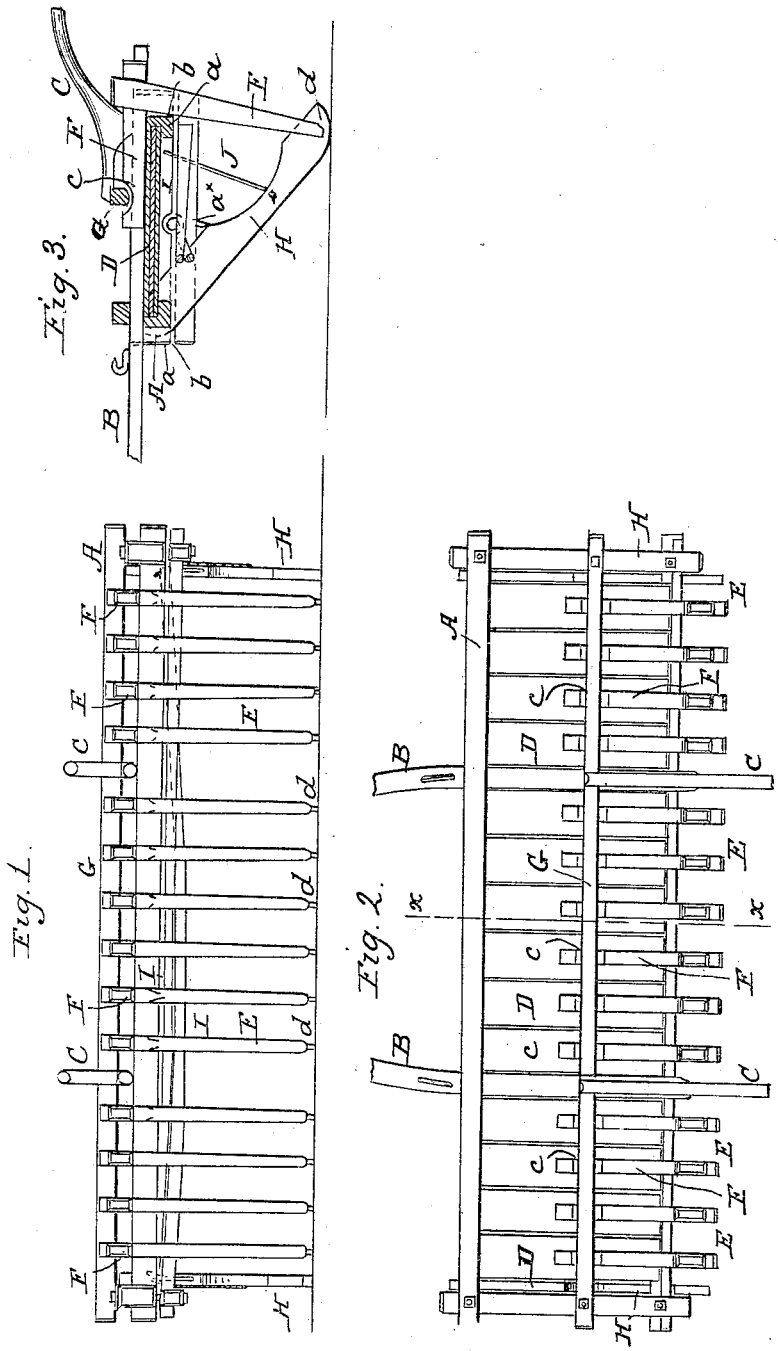

UNITED STATES PATENT OFFICE.

SOLON BINGHAM, OF TROY, NEW YORK.

IMPROVEMENT IN HORSE-RAKES.

Specification forming part of Letters Patent No. 51,287, dated December 5, 1865.

*To all whom it may concern:*

Be it known that I, SOLON BINGHAM, of Troy, in the county of Rensselaer and State of New York, have invented a new and Improved Horse-Rake; and I do hereby declare that the following is a full, clear, and exact description thereof, which will enable those skilled in the art to make and use the same, reference being had to the accompanying drawings, forming part of this specification, in which—

Figure 1 is a rear view of my invention; Fig. 2, a plan or top view of the same; Fig. 3, a transverse, vertical section of the same taken in the line $x$ $x$, Fig. 2.

Similar letters of reference indicate corresponding parts.

This invention consists in a novel construction of the teeth of the rake and springs for the same, as well as in a novel manner of mounting the rake, as hereinafter fully shown and described, whereby the device may be managed or operated with the greatest facility by the driver, rendered capable of working perfectly on rough or uneven ground, and capable of being constructed at a very moderate expense.

A represents a rectangular frame, to which thills B B are attached and handles C C. In this frame A there are placed a series of springs, D, the same being constructed of two or more layers of a hard, elastic wood—ash, for instance. These springs rest or are fitted in rabbets, $a$, made in the inner sides of the front and rear pieces, $b$ $b$, of the frame A, as shown in Fig. 3.

E represents the teeth of the rake, which are of wood and have wooden bars F attached to their upper ends, the bars F resting upon the springs D and secured thereon by a strip, G, the ends of which are firmly bolted to the sides of the frame A. This strip G is fitted in notches $c$, made in the upper surfaces of the bars F, near their front ends, as shown in Fig. 3. The lower ends of the teeth E are provided with metal points $d$.

By this arrangement it will be seen that as the rake is drawn along the teeth are allowed to give independently of each other, the wooden springs D keeping the teeth to their work, and at the same time allowing them to yield or give to any obstructions which may be in their path.

In case of the wooden springs becoming set or losing their elasticity by use, they are reversed, turned upside down, and thereby rendered as efficient as at first.

From the above description it will be seen that iron-work is dispensed with, and in case of repairs being necessary they can be made by any person at all clever with tools. The generality of farmers may keep their own rake in perfect working-order.

The rake is mounted on two side bars, H H, the upper ends of which are fitted loosely on the front piece, $b$, of the frame A, said bars being connected by wire-loops $a^x$ to the ends of wooden springs I I. These springs I are attached to the sides of the frame A, extending the whole length of the same, and they have a tendency to press the bars H forward or in a direction toward the front of the frame A, each bar having a cord or chain, J, connected to it, to prevent the bars being pressed forward beyond a certain distance, said chains keeping the bars at an angle of about forty-five degrees. (See Fig. 3.)

The strength of the springs I I is such as to keep the frame A and teeth E nearly balanced, so that the operator or driver having hold of the handle C C may, by a slight movement of the hands upward or downward, raise and lower the rake-teeth, and thereby keep the teeth to their work—that is to say, in contact with the ground—and also raise the same so that they may discharge their load.

It will be seen that the labor required to operate the rake will be very slight, and that it will be under the complete control of the operator, and may be managed on rough and uneven ground with the greatest facility.

Having thus described my invention, I claim as new and desire to secure by Letters Patent—

1. The employment or use, in a horse-rake, of wooden springs D, formed of a series of layers placed one over the other, in connection with teeth E, having bars F attached to their upper ends to rest or bear upon said springs, and retained thereon by a strip, G, or its equivalent, substantially as described.

2. Mounting the rake on bars H H, connected with springs I I, to operate in the manner substantially as and for the purpose set forth.

SOLON BINGHAM.

Witnesses:
HENRY HYDE.
GROVE H. MOORE.